US010911253B2

(12) United States Patent
Goichberg et al.

(10) Patent No.: US 10,911,253 B2
(45) Date of Patent: Feb. 2, 2021

(54) SYSTEMS AND METHODS TO FACILITATE DOWNSTREAM BANDWIDTH UTILIZATION

(71) Applicant: MaxLinear, Inc., Carlsbad, CA (US)

(72) Inventors: Nathan Goichberg, Ashdod (IL); Shaul Shulman, Ramat Gan (IL)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/266,601

(22) Filed: Feb. 4, 2019

(65) Prior Publication Data
US 2020/0252229 A1    Aug. 6, 2020

(51) Int. Cl.
| H04L 12/28 | (2006.01) |
| H04N 21/61 | (2011.01) |
| H04L 5/14 | (2006.01) |
| H04L 12/24 | (2006.01) |

(52) U.S. Cl.
CPC ............ *H04L 12/2801* (2013.01); *H04L 5/14* (2013.01); *H04L 41/0896* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| 6,791,995 | B1 | 9/2004 | Azenkot et al. |
| 7,164,690 | B2 | 1/2007 | Limb et al. |
| 8,730,562 | B1* | 5/2014 | Tauke-Pedretti .......... G02F 7/00 359/325 |
| 2010/0205233 | A1* | 8/2010 | Morgan ................... H01P 1/20 708/205 |
| 2015/0304744 | A1* | 10/2015 | Maricevic .......... H04Q 11/0067 398/67 |
| 2019/0052311 | A1* | 2/2019 | Murugesu ................ H04B 3/21 |

* cited by examiner

*Primary Examiner* — James R Marandi
(74) *Attorney, Agent, or Firm* — Maschoff Brennan

(57) ABSTRACT

A cable modem (CM) system for utilizing additional bandwidth is disclosed. The system includes a receiver path, a feedback path, and a feedback receiver. The receiver path is configured to obtain a base signal having a base bandwidth from a downstream signal. The feedback path is configured to obtain an additional signal having an additional bandwidth from the downstream signal and convert the additional signal to a feedback bandwidth. The feedback receiver of a cable modem tuner is configured to process the additional signal using the feedback bandwidth.

20 Claims, 7 Drawing Sheets

SYSTEMS AND METHODS TO FACILITATE DOWNSTREAM BANDWIDTH UTILIZATION

FIELD

Various embodiments generally relate to communications and bandwidth utilization.

BACKGROUND

Communication systems use a range of frequencies to modulate information, transmit information, decode information and the like. The range of frequencies, also referred to as bandwidth, can enhance or limit data rate, latency, reliability and the like.

However, the available bandwidth for communication is typically limited. As a result, the available bandwidth can limit communication properties.

The available bandwidth is generally allocated for various tasks, downstream communication, upstream communication, and the like. The bandwidth allocation can be inefficient. For example, there may be unused upstream bandwidth while downstream transmissions are waiting or delayed to insufficient bandwidth.

What is needed are techniques to efficiently utilize available bandwidth for communication.

DETAILED DESCRIPTION

Figure 1:
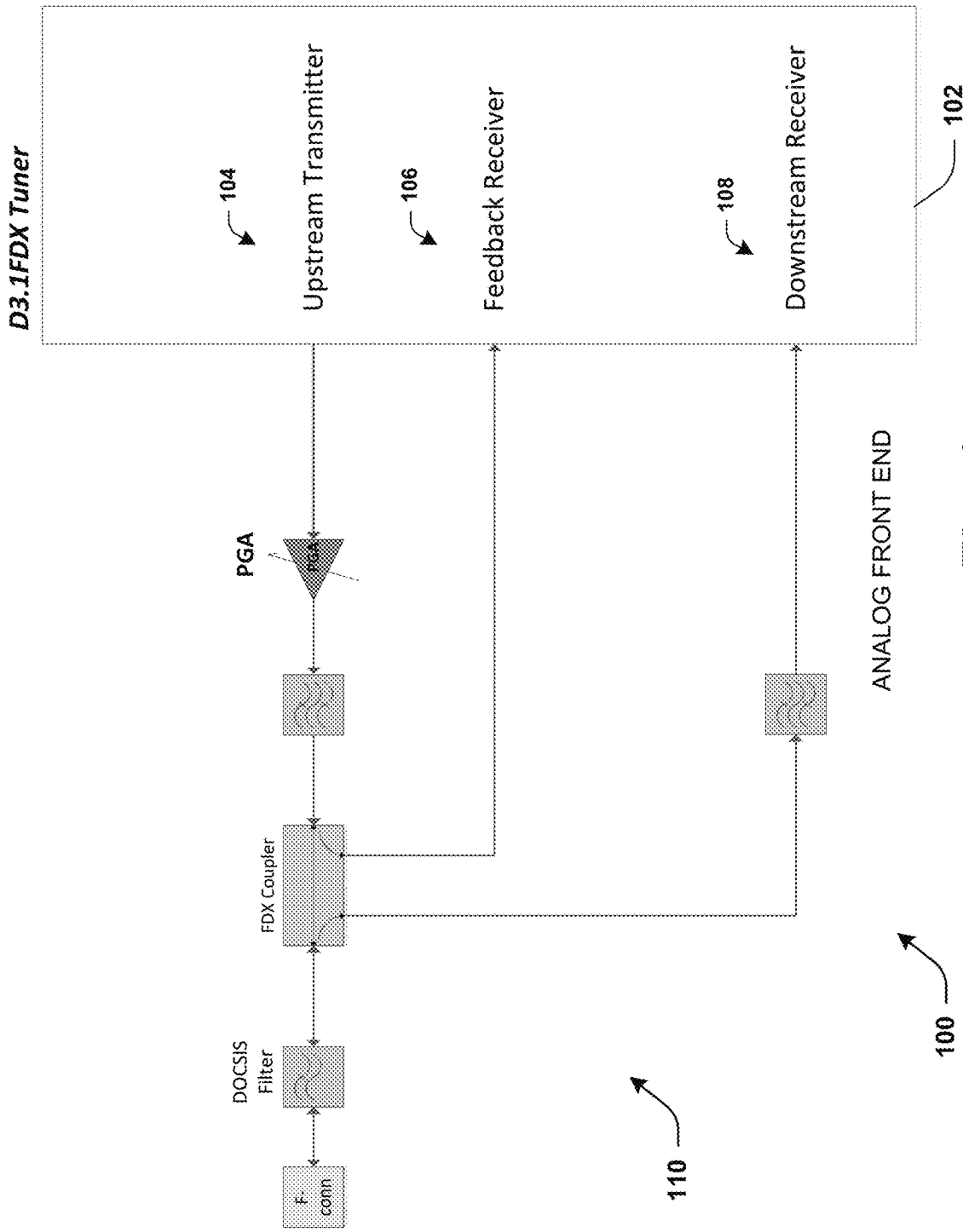
FIG. 1 is a diagram illustrating an architecture for utilizing bandwidth in a cable modem system in accordance with one or more embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1, RAN2, 5G and the like.

Cable modems (CMs) are generally used to connect or bridge a local network with a larger network, such as the Internet. The CM is a network bridge that can provide communication over a medium, such as fibre, coaxial, hybrid fibre-coaxial (HFC) and radio frequency over glass (RFoG).

A CM typically includes an analog front end (AFE) and a system on chip (SoC). The CM can be compatible or support a cable modem standard, such as device over cable service interface specification (DOCSIS) and various versions such as 3.0, 3.1, 3.1 Full Duplex and the like.

ACM communication system generally has upstream and downstream bandwidth allocations, which can be specified in various specifications, standards and the like. The upstream communication is generally from a cable modem to a network and the downstream communication is generally from the network to the cable modem. The communication can also be specified as full duplex or half duplex. In full duplex, both upstream and downstream communications happen at the same time. In half duplex operation, there is either upstream or downstream communication.

Techniques are needed to better utilize the bandwidth allocation for CM communication.

One or more embodiments are disclosed that facilitate bandwidth allocation and utilization for communication, including CM communication. The embodiments include using a second receive path for a front end of a CM. The operation of the second receive path can be repurposed or altered to utilize additional bandwidth for downstream communication. The embodiments also include a second receive path that utilizes under-sampling to utilize additional bandwidth for downstream communication.

FIG. 1 is a diagram illustrating an architecture 100 for utilizing bandwidth in a cable modem system in accordance with one or more embodiments. The architecture 100 can be implemented as an apparatus or system and is provided for illustrative purposes. It is appreciated that additional elements can be included in the architecture, one or more of the included elements can be omitted and one or more the elements can be replaced by a suitable element.

The architecture 100 can be used with or as part of an analog front end (AFE) for a cable modem (CM) system. The architecture 100 includes a tuner 102 and front end paths 110.

The front end paths 110 can include filters, amplifiers and the like and couple an infra-structure to the tuner 102. The paths 110 can include an infra-structure connection (F-conn), a DOCSIS filter, an FDX coupler, an upstream filter, an upstream amplifier or PGA, a downstream filter and the like. The paths 110 include an upstream path, a feedback receiver path and a downstream path.

The infra-structure can include coaxial, fibre, hybrid-fibre coaxial, and the like. The infra-structure can be connected to other cable modems, network devices and the like.

The tuner 102 includes an upstream transmitter 104, a feedback receiver 106 and a downstream receiver 108.

The tuner 102 can be configured to operate in accordance with one or more standards or specifications including DOCSIS, DOCSIS 3.0, DOCSIS 3.1, DOCSIS 3.1 FDX and the like.

DOCSIS 3.1 FDX supports full duplex operation (FDX) at frequencies up to 1.2 GHz.

The upstream transmitter(s) 104 generate signals for upstream transmission on the infrastructure via the upstream path of the paths 110. The upstream transmitters 104 can include an FDX band transmitter, a non-FDX band transmitter and the like.

The feedback receiver 106 generally receives feedback information related to the upstream transmissions via the feedback path of the paths 110. The tuner 102 is configured to utilize the feedback information to reduce noise, enhance signal to noise ratios for transmission and the like. In one example, the tuner 102 operates in a full duplex mode and uses the feedback information to perform echo canceling.

The downstream receiver(s) 108 are configured to receive downstream signals via the downstream path of the paths 110. The downstream receivers 108 provides the received downstream signals to a cable modem chip or silicon on chip (SoC), which then processes the received signals. The downstream receivers 108 can include a FDX band receiver, a non-FDX band receiver, a D/S band receiver and the like.

The downstream signals utilize a first bandwidth or range of frequencies. For example, the first bandwidth can include frequencies up to 1.2 giga hertz (GHz) in accordance with a standard, such as DOCSIS. It is appreciated that the first bandwidth and use other suitable frequencies or bandwidths.

The tuner 102 can be configured to operate in an additional or extended bandwidth mode where the feedback receiver 106 is configured to receive additional downstream signals using additional bandwidth. In this mode, the feedback receiver 106 is not typically gathering feedback information. Instead, the feedback receiver is configured to receive the additional downstream signals. The additional downstream signals use the additional bandwidth, which can be different or varied from the first bandwidth. In one example, the additional bandwidth includes frequencies from 1.2 GHz to 1.8 GHz. It is appreciated that other frequency ranges or bandwidths are contemplated.

The additional bandwidth mode, in one example, is a variation from the DOCSIS 3.1 FDX mode. In this example, the additional bandwidth mode has half duplex (HDX) operation for downstream for frequencies up to 1.8 GHz.

It is appreciated that suitable variations of the architecture 100 are contemplated.

Figure 2:
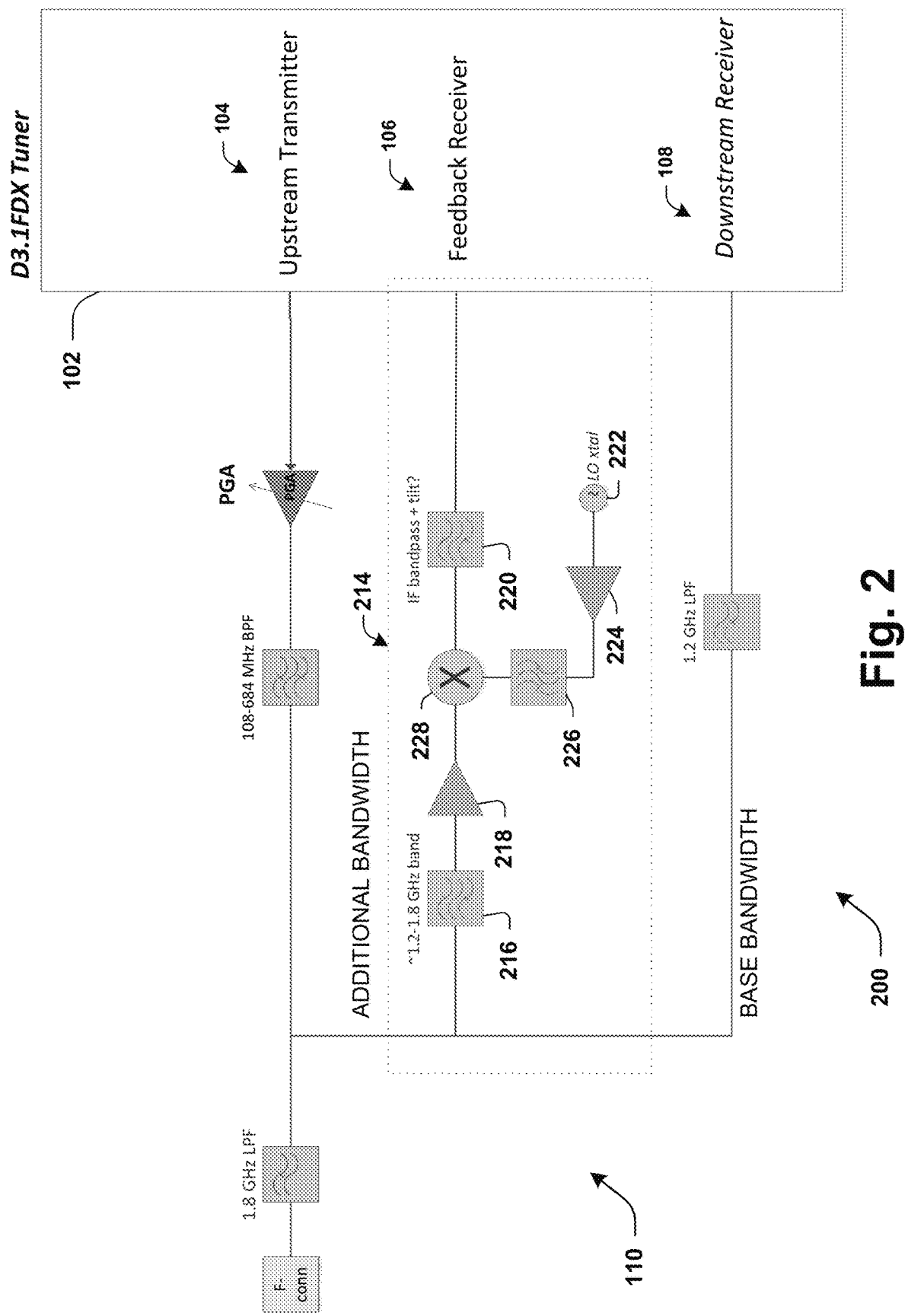
FIG. 2 is a diagram illustrating an architecture for utilizing bandwidth in a cable modem system using down-conversion in accordance with one or more embodiments.

FIG. 2 is a diagram illustrating an architecture 200 for utilizing bandwidth in a cable modem system using down-conversion in accordance with one or more embodiments. The architecture 200 can be implemented as an apparatus or system and is provided for illustrative purposes. It is appreciated that additional elements can be included in the architecture, one or more of the included elements can be omitted and one or more the elements can be replaced by a suitable element.

The architecture 200 can be used with or as part of an analog front end (AFE) for a cable modem (CM) system. The architecture 200 includes a tuner 102 and front end paths 110.

The operation of the architecture 200 is similar to the operation of the architecture 100, which can be referenced for additional understanding.

The front end paths 110 includes feedback receiver path 214, which is used and/or configured to operate in the extended/additional bandwidth mode. The feedback receiver 106 of the tuner 102 is configured to receive signals at a feedback bandwidth, such as up to 1.2 GHz. Generally, the feedback bandwidth is less than or equal to a receiver bandwidth for the downstream receiver 108.

The front end paths 110 can additionally include a coupler, such as a FDX coupler, and one or more switches to control modes of operation, such as FDX.

The front end paths 110 are configured to receive signals having an enhanced or additional bandwidth. This bandwidth includes a base or standard bandwidth up to a first frequency, such as 1.2 GHz, and an additional bandwidth from the first frequency to an additional, higher frequency, such as 1.8 GHz.

The front end paths 110 are configured to pass the base bandwidth to the downstream receiver 108 of the tuner 102 using the downstream path of the paths 110. The front end paths 110 are also configured to pass the additional bandwidth to the feedback receiver 106 using the feedback receiver path 214.

The feedback receiver 106 is typically not configured to handle signals at the additional bandwidth. For example, the feedback receiver 106 can be limited to signals up to only the first frequency.

The feedback path 214 is configured to extract or obtain downstream signals in the additional bandwidth. In one example, the feedback path 214 filter signals to obtain or extract the downstream signals in the additional bandwidth. Additionally, the feedback path 214 is configured to down-convert the additional downstream signals to be within the feedback bandwidth.

The feedback receiver 106 is generally configured for operation within the feedback bandwidth and can process the additional downstream signals.

The SoC (not shown) is configured to process the additional downstream signals which are provided to the SoC. The SoC can be configured to receive the additional downstream signals, channelize the additional downstream signals, perform automatic gain control (AGC) compensation on the additional downstream signals, demodulation of the additional downstream channels and the like using additional information provided by the feedback receiver path 214. Thus, the path 214 can be configured to provide original frequencies or bandwidths, down converted frequencies, original channels, filtering values, down-conversion information, and the like to the SoC.

It is appreciated that if an additional downstream channel/signal's original frequency is known, the SoC's phase and frequency tracking circuits can compensate correctly despite the frequency down-conversion.

In one example, as shown in FIG. 2, the feedback path 214 includes a first filter 216 (1.2-1.8 GHz filter in this example) and a first amplifier 218 to the received signal. The first filter 216 selects the target frequency band or the additional bandwidth, such as 1.2-1.8 GHz. The first amplifier 218 boosts the signal to compensate for the filters insertion loss and the mixer conversion loss. The path 214 also includes an IF bandpass filter 220, which is configured to filter out undesired/unselected products of the signal mixing and leave only the selected products. The feedback path 214 also includes a LO crystal 222, LO amplifier 224 and LO filter 226, which are an example of suitable circuitry to generate the local oscillator signal. A mixer 228 facilitates the down-conversion of the additional bandwidth.

In another example, there are two filters in the path 214 for the additional downstream bandwidth. There can be a challenge around the frequencies in the end of the lower band and the beginning of the upper band. Generally, if the filters pass the same frequencies there is an impact on receive performance due to power division and if a band is rejected by both filters this results in receive performance impact in the band and return loss impact.

The filters of the feedback path 214 can be configured to mitigate this possible impact on receive performance. The filters can overlap the filter bands and allow some impact on performance in part of the spectrum due to lower power resulting from power being divided between the two filters The up to 1.2 GHz band may end at 1.2 GHz while the above band may start below 1.2 GHz. The frequencies above 1.2 GHz will be taken from the down-converted band, even if they are partially seen by the downstream receiver Define a band around 1.2 GHz as a guard band and remove requirements for reception and return loss in the band, allowing sufficient guard band for filter slopes Non-reflective filter design may help mitigate echoes between the filters and return loss issues The tuner 102 can be configured to operate in other modes where the additional bandwidth is not utilized and/or received by the feedback receiver 106. In the other modes, the operation of the feedback path 214 is altered. For example, the feedback path 214 can be configured to provide feedback information to the feedback receiver 106 in the other modes, as shown above with the architecture 100.

The feedback path 214 and/or the front end circuitry 110 can include additional circuitry switches and the like to configure operation of the other modes, such as full duplex (FDX) and the additional/enhanced bandwidth mode. In one example, the additional circuitry is selectably configured to cause the feedback path 214 to operate in the FDX mode without performing downconversion of the additional bandwidth. The additional circuitry is selectably configured to cause the feedback path 214 to operate in the extended/additional bandwidth mode where the above downconversion of the additional bandwidth occurs.

Figure 3:
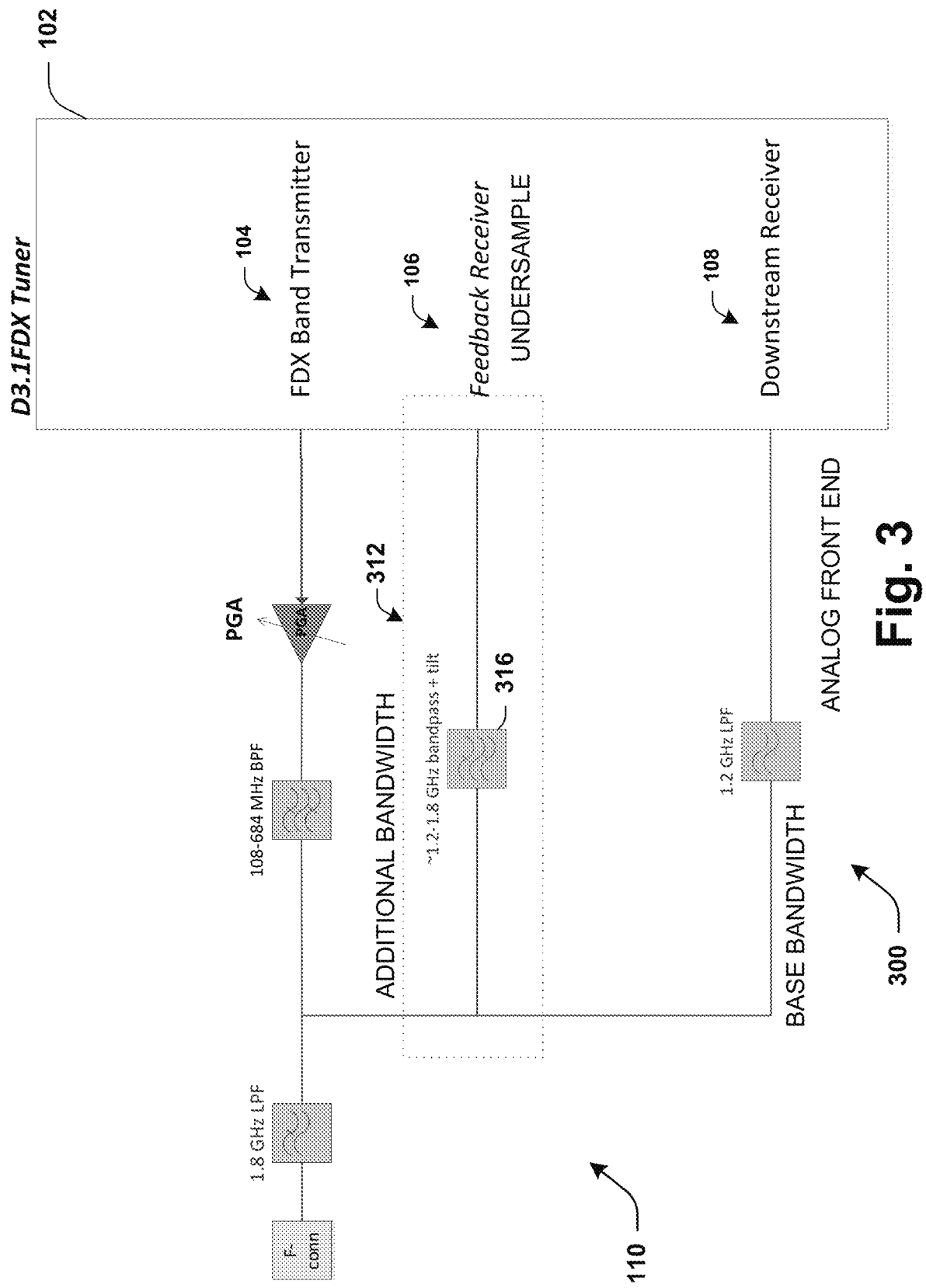
FIG. 3 is a diagram illustrating an architecture for utilizing bandwidth in a cable modem system using under-sampling in accordance with one or more embodiments.

FIG. 3 is a diagram illustrating an architecture 300 for utilizing bandwidth in a cable modem system using undersampling in accordance with one or more embodiments. The architecture 300 can be implemented as an apparatus or system and is provided for illustrative purposes. It is appreciated that additional elements can be included in the architecture, one or more of the included elements can be omitted and one or more the elements can be replaced by a suitable element.

The architecture 300 can be used with or as part of an analog front end (AFE) for a cable modem (CM) system. The architecture 300 includes a tuner 102 and front end paths 110.

The operation of the architecture 300 is similar to the operation of the architecture 100, which can be referenced for additional understanding.

The front end paths 110 can additionally include a coupler, such as a FDX coupler, and one or more switches to control modes of operation, such as FDX.

The front end paths 110 includes feedback receiver path 312, which is used and/or configured to operate in the extended bandwidth mode. The feedback receiver 106 of the tuner 102 is configured to receive signals at a feedback bandwidth, such as up to 1.2 GHz. Generally, the feedback bandwidth is less than or equal to a receiver bandwidth for the downstream receiver 108.

The front end paths 110 are configured to receive signals having an enhanced or additional bandwidth. This bandwidth includes a base or standard bandwidth up to a first frequency, such as 1.2 GHz, and an additional bandwidth from the first frequency to an additional, higher frequency, such as 1.8 GHz.

The front end paths 110 are configured to pass the base bandwidth to the downstream receiver 108 of the tuner 102 using the downstream path of the paths 110. The front end paths 110 are also configured to pass the additional bandwidth to the feedback receiver 106 using the feedback receiver path 312.

The feedback receiver 106 is typically not configured to handle signals at the additional bandwidth or up to a feedback frequency. For example, the feedback receiver 106 can be limited to signals up to only the first frequency.

The feedback path 312 is configured to extract or obtain downstream signals in the additional bandwidth. In one example, the feedback path 312 filter signals to obtain or extract the downstream signals in the additional bandwidth. Additionally, the feedback path 312 is configured to under sample the additional downstream signals to be within the feedback bandwidth. In one example, the feedback bandwidth is up to 684 mega hertz (MHz).

The feedback path 312 can include various filters, bandpass filters, amplifiers, mixers and the like.

In one example, shown in FIG. 3, the feedback path 312 includes a feedback path filter 316. FIG. 3 shows the filter 316 as a 1.2-1.8 GHz filter, however it is appreciated that other filters, frequency ranges and the like can be employed. This filter 316 is configured to pass a target band or additional bandwidth and reject the other frequencies that may interfere with the reception or alias into the band of interest when sampled. It is appreciated that other filters, elements and the like can be used in the feedback path 312.

In order to obtain the additional downstream signals, the feedback receiver 106 is configured to undersample using a feedback sampling frequency. This sampling frequency of a sampler or analog to digital converter (ADC) is at least twice the frequency of the feedback frequency. Additionally, this feedback sampling frequency can be selected to be high enough to allow for anti-aliasing filter roll off.

It is appreciated that other factors can be utilized for determining the sampling rate including, but not limited to, providing a higher over-sampling ratio.

As an example, if the additional bandwidth is in the 1.2-1.8 GHz range, the feedback sampling rate is in a second ($2^{nd}$) Nyquist zone and the feedback sampling rate (Fs) should be above 1.8 GHz. Further, assuming a 5 percent roll off bandwidth, the sampling rate is about 1.9 GHz. However, in order to allow for filter roll-off below 1.2 GHz, Fs/2 is less than or equal to about 1.15 GHz, which means that Fs higher edge for undersampling is at about 2.3 GHz for sampling in the $2^{nd}$ Nyquist zone of 1.9 GHz<Fs<2.3 GHz.

The feedback receiver 106 is generally configured for operation within the feedback bandwidth and can process the additional downstream signals.

The feedback path 312 and/or the front end circuitry 110 can include additional circuitry switches and the like to configure operation of the other modes, such as full duplex (FDX) and the additional/enhanced bandwidth mode. In one example, the additional circuitry is selectably configured to cause the feedback path 312 and the feedback receiver 106 to operate in the FDX mode without performing undersampling of the additional bandwidth. The additional circuitry is selectably configured to cause the feedback path 312 to operate in the extended/additional bandwidth mode where the undersampling of the additional bandwidth occurs.

It is further appreciated that the feedback path 312 can be configured to support a plurality of techniques of utilizing the additional bandwidth. For example, the system 300 can also include the feedback path 214 and allow selection of either path. It is appreciated that other suitable variations are contemplated.

Figure 4:
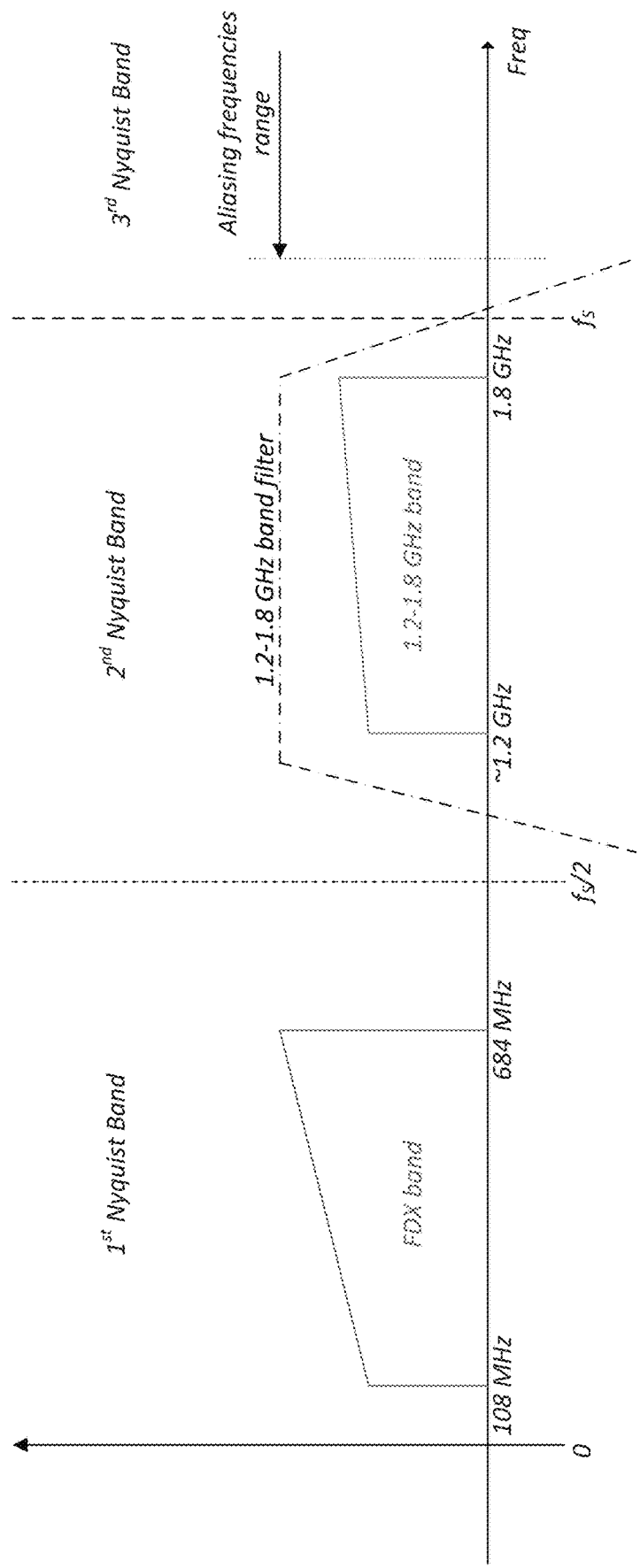
FIG. 4 is a diagram illustrating an example feedback sampling rate for a feedback receiver configured to use additional bandwidth in accordance with one or more embodiments.

FIG. 4 is a diagram illustrating an example feedback sampling rate 400 for a feedback receiver configured to use additional bandwidth in accordance with one or more embodiments. The sampling rate, also designated as Fs, can be used in the architecture 300 and variations thereof.

Example frequency values and bandwidths are provided for illustrative purposes. It is appreciated that other frequency values and bandwidths can be utilized and are contemplated.

In this example, the feedback receiver 106 is configured to process or operate in a feedback band or bandwidth of about 108 MHz to 684 MHz. This band is referred to as a first ($1^{st}$) Nyquist band.

A second ($2^{nd}$) Nyquist band is determined as from fs/2 up to fs. The feedback path 312 is configured to have one or more filters to filter the additional band between about 1.2 to 1.8 GHz. In one example, the one or more filters include a 1.2 to 1.8 GHz bandpass filter.

The sampling rate Fs is selected as described above to, as an example, about 1.9 GHz.

The SoC (not shown) can be configured to digitally down-convert and demodulate frequency-inversed data from the feedback receiver including channelization, AGC compensation, demodulation and other functionality of downstream channel reception and the like.

Figure 5:
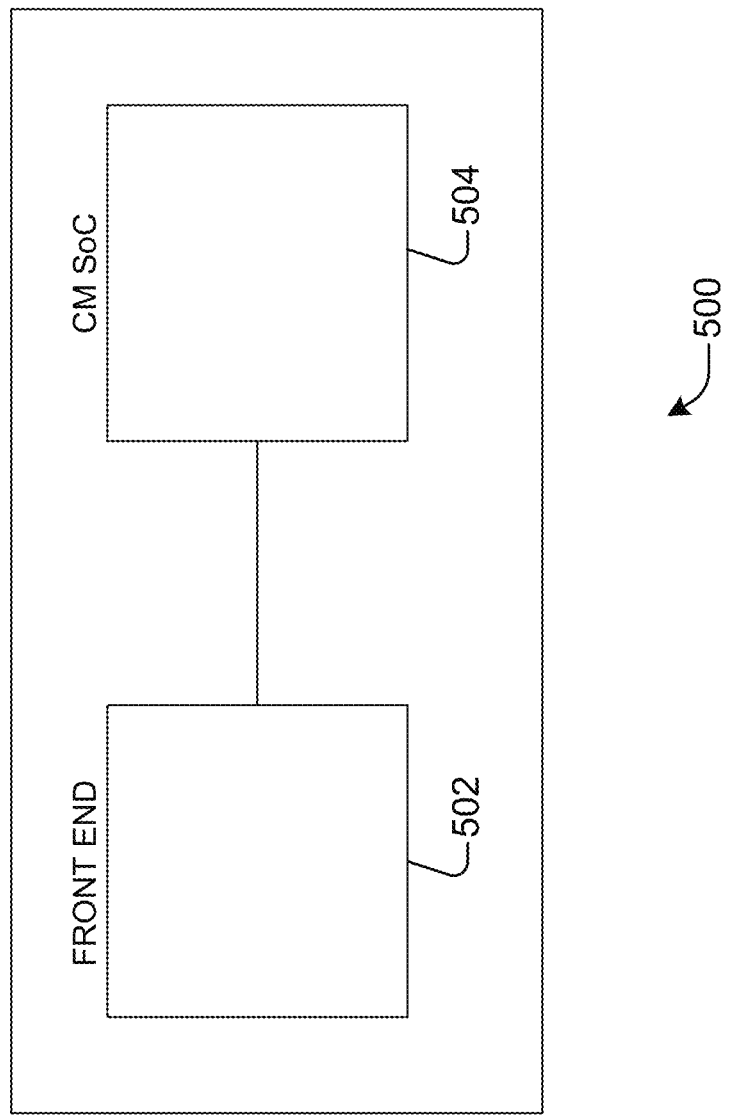
FIG. 5 is a diagram illustrating an example cable modem in accordance with some embodiments.

FIG. 5 is a diagram illustrating an example cable modem 500 in accordance with some embodiments. The cable modem 500 is provided for illustrative purposes and it is appreciated that suitable variations are contemplated.

The cable modem 500 includes a front end 502 and a silicon on chip (SoC) 504. The front end 502 and the SoC are connected via an interface.

The cable modem 500 can be at least partially used with the architectures described above.

The front end 502 is an analog front end and sends and receives signals via an infrastructure. The infrastructure can include a coaxial cable and the like. The front end 502 processes received signals and provides these signals to the SoC in digital form using the interface. The front end 502 also processes signals from the SoC for transmission via the infrastructure.

The CM 500 and/or the SoC 504 can be compatible cable modem specifications such as data over cable service interface specification (DOCSIS) versions 3.0, 3.1, 3.1 Full Duplex, and the like. The SoC 504 includes circuitry to form modulation, demodulation, encoding, decoding, signal processing and the like.

The SoC 504 can include circuitry configured to utilize additional information from a feedback path, such as the feedback path 212, to processes obtained additional signals.

Figure 6:
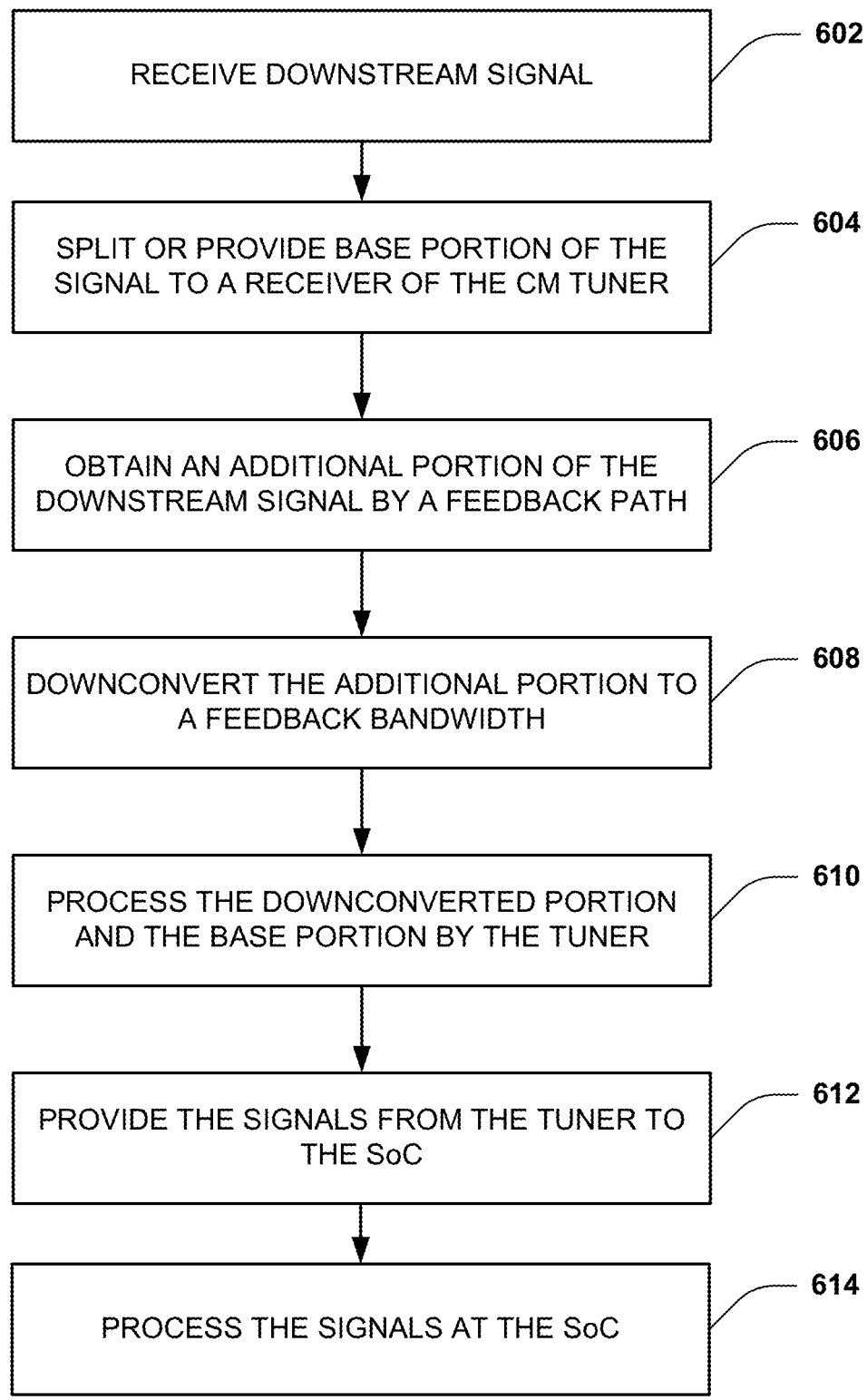
FIG. 6 is a flow diagram illustrating a method of down-converting an additional bandwidth of downstream signals in accordance with one or more embodiments.

FIG. 6 is a flow diagram illustrating a method 600 of downconverting an additional bandwidth of downstream signals in accordance with one or more embodiments. The method 600 is provided for illustrative purposes and it is appreciated that suitable variations are contemplated.

The method 600 can be understood with and in reference to the architectures 100-300 described above.

The method 600 begins at block 602 where a downstream signal is received. The downstream signal can have a plurality of signals. The downstream signal utilizes a total bandwidth that includes a base bandwidth and an additional bandwidth.

A base portion of the received signal is provided to a receiver of a cable modem tuner at block 604. The base portion is at or within a base bandwidth.

A feedback path obtains an additional portion of the received signal at block 606. The additional portion is at or within an additional bandwidth.

In one example, the total bandwidth is 0 to 1.8 GHz, the base bandwidth is 0 to 1.2 GHz and the additional bandwidth is 1.2 GHz to 1.8 GHz. However, it is appreciated that these bandwidth can utilize other suitable frequency values.

The feedback path downconverts the additional portion of the signal to a feedback bandwidth and generates feedback or downconvert information at block 608.

The feedback receiver processes the downconverted signal and the receiver processes the base signal at block 610.

The tuner provides the downconverted signal and the base signal to a SoC using an interface at block 612.

The SoC processes the downconverted signal and the base signal using the feedback or downconvert information at block 614.

It is appreciated that suitable variations of the method 600 are contemplated. For example, one or more blocks can be omitted and additional blocks, not shown, can also be included.

Figure 7:
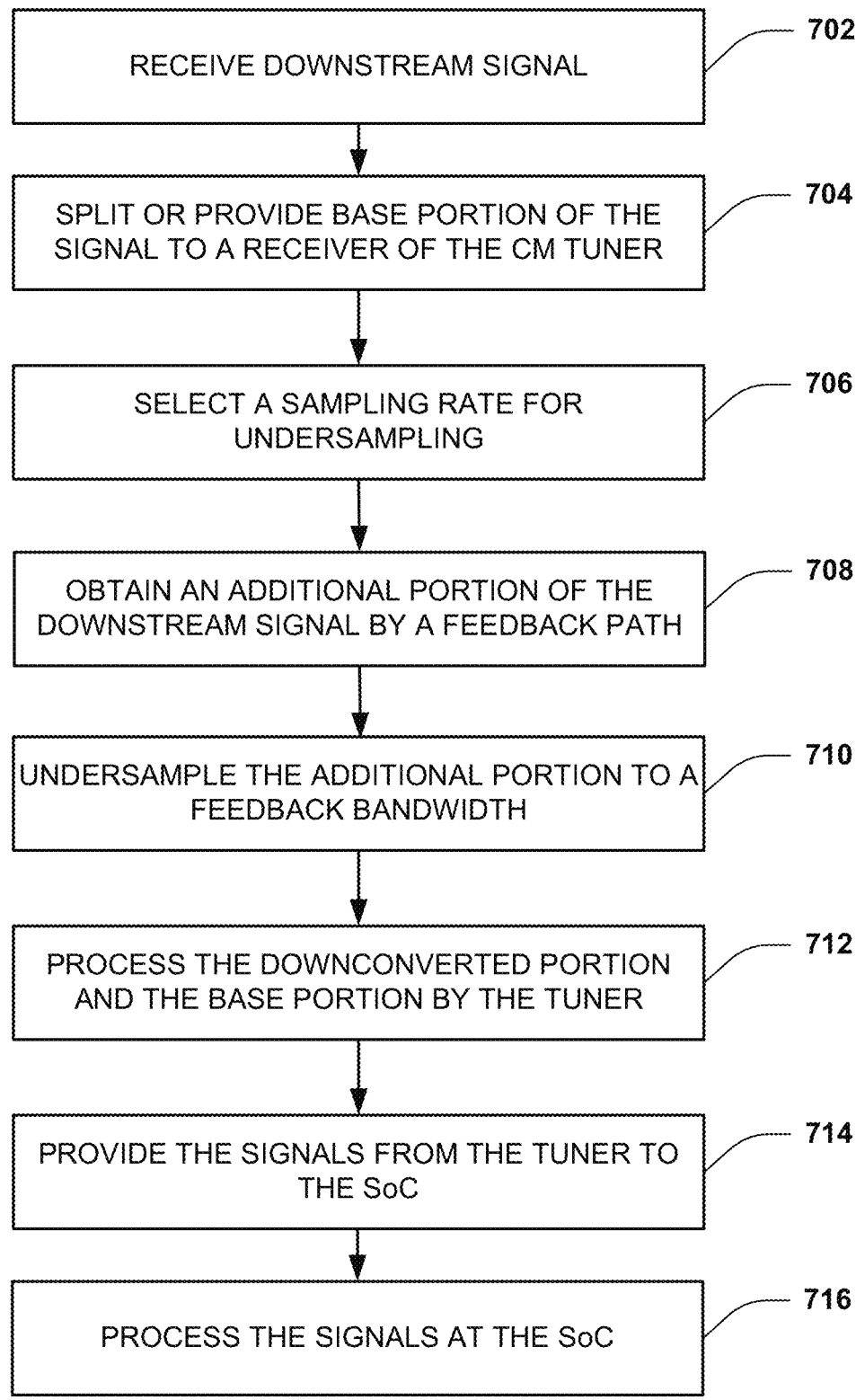
FIG. 7 is a flow diagram illustrating a method of under-sampling an additional bandwidth of downstream signals in accordance with one or more embodiments.

FIG. 7 is a flow diagram illustrating a method 700 of undersampling an additional bandwidth of downstream signals in accordance with one or more embodiments. The method 700 is provided for illustrative purposes and it is appreciated that suitable variations are contemplated.

The method 700 can be understood with and in reference to the architectures 100-300 described above.

The method 700 begins at block 702 where a downstream signal is received. The downstream signal can have a plurality of signals. The downstream signal utilizes a total bandwidth that includes a base bandwidth and an additional bandwidth.

A base portion of the received signal is provided to a receiver of a cable modem tuner at block 704. The base portion is at or within a base bandwidth.

A feedback path obtains an additional portion of the received signal at block 706. The additional portion is at or within an additional bandwidth.

In one example, the total bandwidth is 0 to 1.8 GHz, the base bandwidth is 0 to 1.2 GHz and the additional bandwidth is 1.2 GHz to 1.8 GHz. However, it is appreciated that these bandwidth can utilize other suitable frequency values.

A sampling rate for undersampling is selected for the feedback receiver based on a feedback bandwidth, the additional bandwidth and the like at block 708.

The feedback path undersamples the additional portion of the signal to a feedback bandwidth at block 710.

The feedback receiver processes the downconverted signal and the receiver processes the base signal at block 712.

The tuner provides the downconverted signal and the base signal to a SoC using an interface at block 714.

The SoC processes the downconverted signal and the base signal at block 714.

It is appreciated that suitable variations of the method 700 are contemplated. For example, one or more blocks can be omitted and additional blocks, not shown, can also be included.

As utilized above and herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor shared,) dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a cable modem (CM) system for utilizing additional bandwidth. The system includes a receiver path, a feedback path, and a feedback receiver. The receiver path is configured to obtain a base signal having a base bandwidth from a downstream signal. The feedback path is configured to obtain an additional signal having an additional bandwidth from the downstream signal and convert the additional signal to a feedback bandwidth. The feedback receiver of a cable modem tuner is configured to process the additional signal using the feedback bandwidth.

Example 2 includes the subject matter of Example 1, including or omitting optional elements, wherein the additional bandwidth is higher than the base bandwidth.

Example 3 includes the subject matter of any of Examples 1-2, including or omitting optional elements, wherein the feedback bandwidth is up to 682 mega hertz (MHz), the additional bandwidth is at about 1.2 giga hertz (GHz) to about 1.8 GHz and the base bandwidth is at about 0 to 1.2 GHz.

Example 4 includes the subject matter of any of Examples 1-3, including or omitting optional elements, further comprising a downstream receiver of the tuner configured to operate at the base bandwidth and to receive the base signal.

Example 5 includes the subject matter of any of Examples 1-4, including or omitting optional elements, further comprising a transmitter of the tuner configured to generate upstream signals for transmission.

Example 6 includes the subject matter of any of Examples 1-5, including or omitting optional elements, wherein the feedback path includes a bandpass filter configured to the additional bandwidth and configured to filter the downstream signal to obtain the additional signal.

Example 7 includes the subject matter of any of Examples 1-6, including or omitting optional elements, wherein the feedback path is configured to down-convert the additional signal from the additional bandwidth to the feedback bandwidth.

Example 8 includes the subject matter of any of Examples 1-7, including or omitting optional elements, wherein the feedback path is configured to facilitate under-sampling the additional signal from the additional bandwidth to the feedback bandwidth.

Example 9 includes the subject matter of any of Examples 1-8, including or omitting optional elements, wherein the feedback receiver is configured to obtain process the additional signal in an additional bandwidth mode and to perform echo cancellation in a full duplex mode.

Example 10 includes the subject matter of any of Examples 1-9, including or omitting optional elements, wherein the tuner is configured to select an undersampling rate for the feedback receiver.

Example 11 includes the subject matter of any of Examples 1-10, including or omitting optional elements, further comprising a system on chip (SoC) configured to channelize the additional signal base on the additional bandwidth.

Example 12 is a cable modem system for utilizing additional bandwidth. The system includes a feedback path and a tuner. The feedback path is configured to filter a downstream signal to obtain an additional signal at an additional bandwidth and convert the additional bandwidth to a feedback bandwidth. The tuner is configured to operate at the feedback bandwidth.

Example 13 includes the subject matter of Example 12, including or omitting optional elements, wherein the feedback path is configured to overlap filter bands and to downconvert the additional signal.

Example 14 includes the subject matter of any of Examples 11-13, including or omitting optional elements, wherein the feedback path is configured to define a guard band at a lower limit of the additional bandwidth.

Example 15 includes the subject matter of any of Examples 11-14, including or omitting optional elements, wherein the feedback path is configured to incorporate a non-reflective filter to mitigate echoes and return loss.

Example 16 includes the subject matter of any of Examples 11-15, including or omitting optional elements, wherein the tuner is configured to select a sampling rate for undersampling based on the additional bandwidth and a feedback bandwidth.

Example 17 is one or more computer-readable media having instructions that, when executed, cause a cable modem to: receive a downstream signal having a total bandwidth from an infrastructure; obtain a base signal from the downstream signal having a base bandwidth; obtain an additional signal from the downstream signal having an additional bandwidth; convert the additional signal to a feedback receiver bandwidth; and process the additional signal.

Example 18 includes the subject matter of Example 17, including or omitting optional elements, wherein the instructions, when executed cause the CM to down-convert the additional signal from the additional bandwidth to the feedback receiver bandwidth.

Example 19 includes the subject matter of any of Examples 17-18, including or omitting optional elements, wherein the instructions, when executed cause the CM to select a sampling rate and under-sample the additional signal at the selected sampling rate.

Example 20 includes the subject matter of any of Examples 17-19, including or omitting optional elements, wherein the instructions, when executed cause the CM to channelize the additional signal using original frequencies of the additional signal.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). The techniques can also be used with new radio (NR) 5G, also from the 3GPP organization. Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Techniques described herein can be used for various cable modem systems and standards. These standards include, but are not limited to, data over cable service interface specification (DOCSIS) versions 3.0, 3.1 and 3.1 Full Duplex.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A cable modem (CM) system for utilizing additional bandwidth in downstream reception, the system comprising:
 a receiver path configured to receive a downstream signal and obtain a base signal having a base bandwidth from the downstream signal;
 a feedback path configured to receive the downstream signal and obtain an additional signal having an additional bandwidth from the downstream signal and convert the additional signal to a feedback bandwidth, wherein the additional bandwidth is different from the base bandwidth, and the feedback bandwidth is less than or equal to the base bandwidth; and
 a feedback receiver of a cable modem tuner configured to process the additional signal converted to the feedback bandwidth,
 wherein the feedback path is selectively configurable to obtain either the additional signal or feedback information related to upstream transmissions.

2. The system of claim 1, wherein the additional bandwidth is higher than the base bandwidth.

3. The system of claim 1, wherein the feedback bandwidth is up to 682 mega hertz (MHz), the additional bandwidth is at about 1.2 giga hertz (GHz) to about 1.8 GHz and the base bandwidth is at about 0 to 1.2 GHz.

4. The system of claim 1, further comprising a downstream receiver of the tuner configured to operate at the base bandwidth and to receive the base signal.

5. The system of claim 1, further comprising a transmitter of the tuner configured to generate upstream signals for transmission.

6. The system of claim 1, wherein the feedback path includes a bandpass filter configured to the additional bandwidth and configured to filter the downstream signal to obtain the additional signal.

7. The system of claim 1, wherein the feedback path is configured to down-convert the additional signal from the additional bandwidth to the feedback bandwidth.

8. The system of claim 1, wherein the feedback path is configured to facilitate under-sampling the additional signal from the additional bandwidth to the feedback bandwidth.

9. The system of claim 1, wherein the feedback receiver is configured to obtain process the additional signal in an additional bandwidth mode and to perform echo cancellation in a full duplex mode.

10. The system of claim 1, wherein the tuner is configured to select an undersampling rate for the feedback receiver.

11. The system of claim 1, further comprising a system on chip (SoC) configured to channelize the additional signal base on the additional bandwidth.

12. A cable modem system for utilizing additional bandwidth, the system comprising:
 a receiver path configured to receive a downstream signal and obtain a base signal at a base bandwidth from the downstream signal;
 a feedback path configured to filter the downstream signal to obtain an additional signal at an additional bandwidth and convert the additional bandwidth to a feedback bandwidth, wherein the additional bandwidth is different from the base bandwidth, and the feedback bandwidth is less than or equal to the base bandwidth; and
 a tuner configured to operate at the feedback bandwidth and process the additional signal converted to the feedback bandwidth,
 wherein the feedback path is selectively configurable to obtain either the additional signal or feedback information related to upstream transmissions.

13. The system of claim 12, wherein the feedback path is configured to overlap filter bands and to downconvert the additional signal.

14. The system of claim 12, wherein the feedback path is configured to define a guard band at a lower limit of the additional bandwidth.

15. The system of claim 12, wherein the feedback path is configured to incorporate a non-reflective filter to mitigate echoes and return loss.

16. The system of claim 12, wherein the tuner is configured to select a sampling rate for undersampling based on the additional bandwidth and a feedback bandwidth.

17. One or more non-transitory computer-readable media having instructions that, when executed, cause a cable modem (CM) to:
 receive a downstream signal having a total bandwidth from an infrastructure;
 obtain, by a receiver path, a base signal from the downstream signal having a base bandwidth;
 obtain, by a feedback path, an additional signal from the downstream signal having an additional bandwidth;
 convert, by the feedback path, the additional signal to a feedback bandwidth, wherein the additional bandwidth is different from the base bandwidth, and the feedback bandwidth is less than or equal to the base bandwidth; and
 process the additional signal converted to the feedback bandwidth,
 wherein either the additional signal or feedback information related to upstream transmissions is selectively obtained by the feedback path.

18. The non-transitory computer-readable media of claim 17, wherein the instructions, when executed cause the CM to down-convert the additional signal from the additional bandwidth to the feedback receiver bandwidth.

19. The non-transitory computer-readable media of claim 17, wherein the instructions, when executed cause the CM to select a sampling rate and under-sample the additional signal at the selected sampling rate.

20. The non-transitory computer-readable media of claim 17, wherein the instructions, when executed cause the CM to channelize the additional signal using original frequencies of the additional signal.

* * * * *